(12) United States Patent
Zhang

(10) Patent No.: US 9,605,600 B2
(45) Date of Patent: Mar. 28, 2017

(54) METHOD FOR SHUTTING OFF AND ACTIVATING A CYLINDER OF AN INTERNAL COMBUSTION ENGINE

(71) Applicant: Continental Automotive GmbH, Hannover (DE)

(72) Inventor: Hong Zhang, Tegernheim (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 297 days.

(21) Appl. No.: 14/358,698

(22) PCT Filed: Nov. 13, 2012

(86) PCT No.: PCT/EP2012/072470
§ 371 (c)(1),
(2) Date: Feb. 10, 2015

(87) PCT Pub. No.: WO2013/072301
PCT Pub. Date: May 23, 2013

(65) Prior Publication Data
US 2015/0152796 A1    Jun. 4, 2015

(30) Foreign Application Priority Data
Nov. 18, 2011   (DE) .................. 10 2011 086 622

(51) Int. Cl.
*F02D 17/02* (2006.01)
*F02D 41/00* (2006.01)
(Continued)

(52) U.S. Cl.
CPC .......... *F02D 17/02* (2013.01); *F01L 1/34409* (2013.01); *F02D 13/0234* (2013.01);
(Continued)

(58) Field of Classification Search
CPC .. F02D 17/02; F02D 41/0002; F02D 41/0087; F02D 13/0234; F02D 2250/21;
(Continued)

(56) References Cited

U.S. PATENT DOCUMENTS

| 6,227,172 B1 * | 5/2001 | Katayama ............. F02D 9/1095 123/456 |
| 6,499,449 B2 | 12/2002 | Michelini et al. ......... 123/90.15 |

(Continued)

FOREIGN PATENT DOCUMENTS

| CN | 1847627 A | 10/2006 | ................ F01L 1/34 |
| CN | 1869414 A | 11/2006 | ................ F01L 1/34 |

(Continued)

OTHER PUBLICATIONS

International Search Report and Written Opinion, Application No. PCT/EP2012/072470, 9 pages, Feb. 25, 2013.
(Continued)

*Primary Examiner* — Joseph Dallo
(74) *Attorney, Agent, or Firm* — Slayden Grubert Beard PLLC

(57) ABSTRACT

A control device and a method for shutting off and/or activating a cylinder of an internal combustion engine that has a plurality of cylinders is implemented in a substantially torque-neutral manner and substantially without increase in fuel consumption. The technique may be performed without requiring ignition retardation.

17 Claims, 3 Drawing Sheets

(51) Int. Cl.
*F02D 13/02* (2006.01)
*F01L 1/344* (2006.01)

(52) U.S. Cl.
CPC ..... *F02D 41/0002* (2013.01); *F02D 41/0087* (2013.01); *F02D 2041/002* (2013.01); *F02D 2041/0012* (2013.01); *F02D 2250/21* (2013.01); *Y02T 10/18* (2013.01); *Y02T 10/42* (2013.01)

(58) Field of Classification Search
CPC ........ F02D 2041/0012; F02D 2041/002; F01L 1/34409; Y02T 10/42; Y02T 10/18
USPC ............ 123/198 F, 90.15, 481, 90.11, 90.16, 123/90.17, 198 DB; 701/102, 103
See application file for complete search history.

(56) References Cited

U.S. PATENT DOCUMENTS

| | | | | |
|---|---|---|---|---|
| 6,647,947 | B2 | 11/2003 | Boyer et al. | 123/198 F |
| 6,817,336 | B2 * | 11/2004 | Glugla | F02B 75/22 |
| | | | | 123/198 F |
| 6,966,287 | B1 | 11/2005 | Livshiz et al. | 123/90.15 |
| 7,669,563 | B2 | 3/2010 | Fujii | 123/90.15 |
| 8,249,796 | B2 * | 8/2012 | Rollinger | F02D 13/06 |
| | | | | 123/198 DB |
| 8,286,471 | B2 * | 10/2012 | Doering | F01L 13/00 |
| | | | | 73/114.79 |
| 8,666,641 | B2 * | 3/2014 | Rollinger | F02D 13/06 |
| | | | | 123/198 DB |
| 8,667,835 | B2 * | 3/2014 | Doering | F01L 13/00 |
| | | | | 73/114.79 |
| 2003/0106524 | A1 * | 6/2003 | Glugla | F02B 75/22 |
| | | | | 123/336 |
| 2007/0028599 | A1 * | 2/2007 | Hartmann | F01L 13/0005 |
| | | | | 60/285 |
| 2008/0066699 | A1 * | 3/2008 | Michelini | F02D 13/0253 |
| | | | | 123/90.11 |
| 2009/0048763 | A1 | 2/2009 | Nishikiori et al. | 701/103 |
| 2010/0154526 | A1 * | 6/2010 | Cinpinski | F01L 1/3442 |
| | | | | 73/114.79 |
| 2010/0154738 | A1 * | 6/2010 | Tsukamoto | F02D 17/02 |
| | | | | 123/198 F |
| 2010/0175462 | A1 * | 7/2010 | Doering | F01L 13/00 |
| | | | | 73/114.31 |
| 2010/0175463 | A1 * | 7/2010 | Doering | F02D 13/06 |
| | | | | 73/114.37 |
| 2010/0211297 | A1 | 8/2010 | Doering et al. | 701/112 |
| 2011/0144883 | A1 * | 6/2011 | Rollinger | F02D 13/06 |
| | | | | 701/102 |
| 2011/0239987 | A1 * | 10/2011 | Maehara | F01L 1/181 |
| | | | | 123/406.46 |
| 2012/0296550 | A1 * | 11/2012 | Rollinger | F02D 13/06 |
| | | | | 701/102 |
| 2013/0013165 | A1 * | 1/2013 | Doering | F01L 13/00 |
| | | | | 701/101 |

FOREIGN PATENT DOCUMENTS

| | | | |
|---|---|---|---|
| CN | 101379283 A | 3/2009 | F02D 41/36 |
| DE | 60125013 T2 | 7/2007 | F02D 13/02 |
| DE | 10306794 B4 | 4/2008 | F02D 43/00 |

OTHER PUBLICATIONS

Chinese Office Action, Application No. 201280067491.0, 14 pages, Dec. 28, 2015.

* cited by examiner

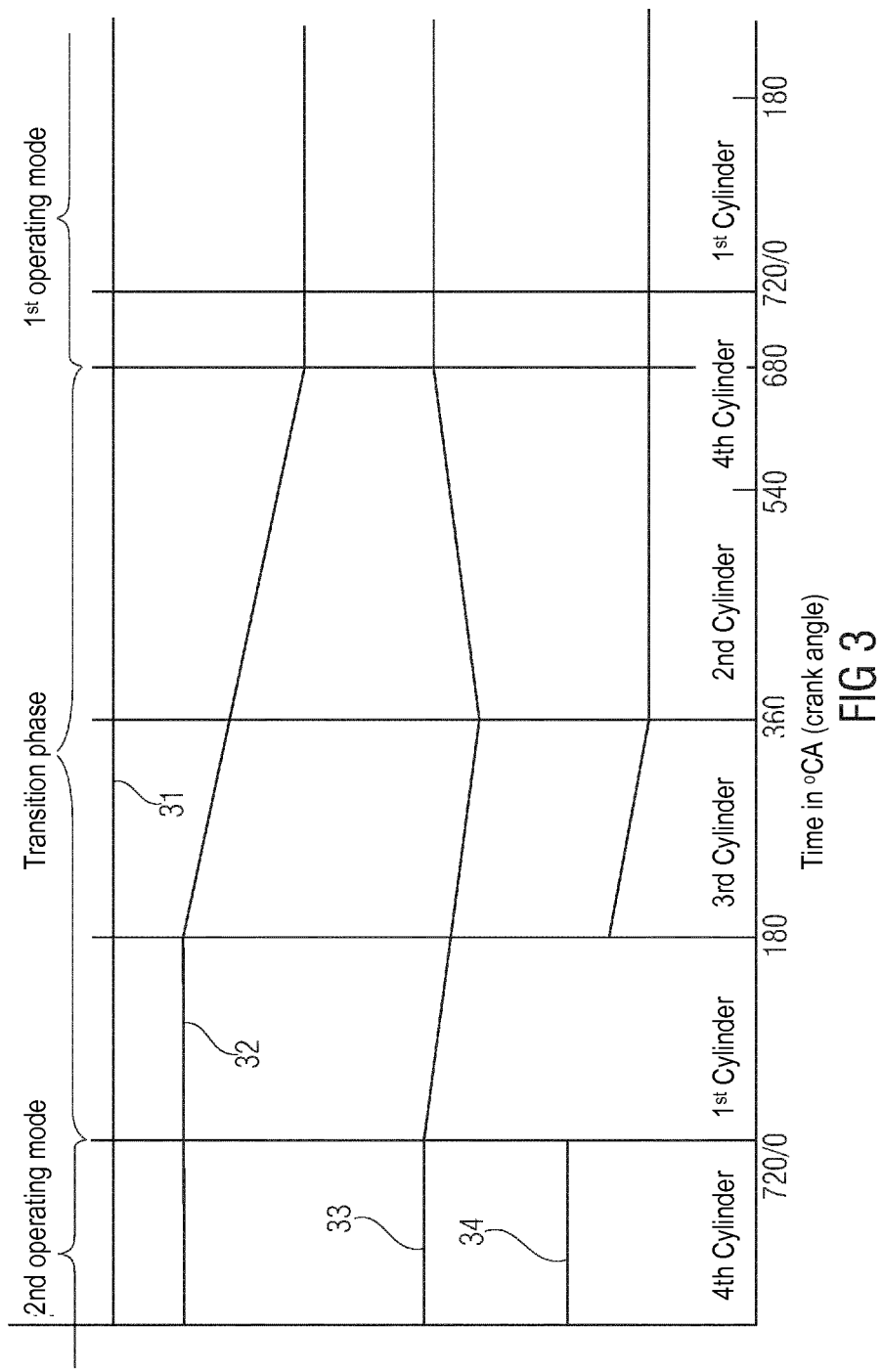

METHOD FOR SHUTTING OFF AND ACTIVATING A CYLINDER OF AN INTERNAL COMBUSTION ENGINE

CROSS-REFERENCE TO RELATED APPLICATIONS

This application is a U.S. National Stage Application of International Application No. PCT/EP2012/072470 filed Nov. 13, 2012, which designates the United States of America, and claims priority to DE Application No. 10 2011 086 622.1 filed Nov. 18, 2011, the contents of which are hereby incorporated by reference in their entirety.

TECHNICAL FIELD

The invention relates to a method for the deactivation of a cylinder of an internal combustion engine, to a method for the activation of a deactivated cylinder of an internal combustion engine, and to a control unit for carrying out the method.

BACKGROUND

In the prior art, DE 103 06 794 B4 discloses a method and a control system for controlling a multi-cylinder internal combustion engine with cylinder deactivation. The internal combustion engine operates on the basis of a four-stroke cycle and is implemented with ignition time control and fuel injection, wherein at least one deactivatable cylinder and one cylinder that remains active are provided, wherein each cylinder has a piston, an outlet valve and at least one inlet valve, and in each case one camshaft-driven control element for the inlet and outlet valves, and a throttle-flap-controlled air induction system is provided for the cylinders. In the event of a transition from a first operating mode, in which both cylinders are active, into a second operating mode, in which the deactivatable cylinder is deactivated, the following steps are performed: the closing and the opening of the inlet valve for the deactivatable cylinder are retarded such that, during the transition, the opening and closing are approximately equally spaced from a top dead centre position of the piston in order to minimize friction and pumping losses; the throttle flap is opened further in order to increase the torque of the cylinder that remains active; the camshaft drive for the cylinder that remains active is advanced in order that, during the transition, the torque for the cylinder that remains active is increased, while at the same time the camshaft drive and the ignition time for the deactivatable cylinder are retarded in order to reduce the torque for the deactivatable cylinder and to then deactivate the outlet valve, the fuel injection nozzle and the ignition spark for the deactivatable cylinder.

SUMMARY

One embodiment provides a method for the deactivation of a cylinder of an internal combustion engine having multiple cylinders, wherein, for preparation for a deactivation of a cylinder, a pressure in the induction region of the cylinders is adapted to a higher target pressure, wherein the target pressure corresponds to a pressure that is intended to prevail in the induction region after the deactivation of the cylinder in order to compress a desired air mass in order to be able to output a desired torque, wherein, during the adaptation of the pressure in the induction region, an adjustment of the opening times of the inlet valves of the cylinders is performed in such a way that the air mass corresponding to the desired torque is inducted into the cylinders and compressed, and wherein, after the target pressure is attained, a cylinder is deactivated, wherein, after the deactivation of the cylinder, the opening times of the inlet valves of the other cylinders are adjusted in such a way that the desired torque is output.

In a further embodiment, the inlet valves are actuated by way of an adjustable camshaft, wherein the opening times of the inlet valves are adjusted by way of an adjustment of the camshaft, and wherein, during a notional induction phase of the deactivated cylinder, the position of the camshaft is adapted in such a way that the opening times of the inlet valves of the active cylinders are adjusted such that the air quantity required for outputting the desired torque is inducted and compressed.

In a further embodiment, in order to fix the opening times of the inlet valves, closing times of the inlet valves are varied.

In a further embodiment, the camshaft is adjusted from a normal position in the direction of retarded closing of the inlet valves while the induction pipe pressure is raised to the target pressure.

In a further embodiment, the camshaft is adjusted from a retarded closing position of the inlet valves during the notional induction phase of the deactivated cylinder in the direction of a more advanced normal position.

In a further embodiment, after the deactivation of the cylinder, an increased air mass is compressed in the cylinders, with the torque being kept the same.

Another embodiment provides a method for the activation of a deactivated cylinder of an internal combustion engine having multiple cylinders, wherein, for preparation for an activation of the deactivated cylinder, a pressure in the induction region of the cylinders is adapted to a lower target pressure, wherein the target pressure corresponds to a pressure that is intended to prevail in the induction region after the activation of the cylinder in order to induct and compress a desired air mass in order to be able to output a desired torque, wherein, during the adaptation of the pressure, an adjustment of the opening times of the inlet valves of the active cylinders is performed in such a way that the air mass corresponding to the desired torque is compressed in the cylinders, wherein, before the activation of the deactivated cylinder, the opening times of the inlet valves of the active cylinders are adjusted in such a way that the desired torque is output, and wherein, after the target pressure is attained, the deactivated cylinder is activated.

In a further embodiment, the inlet valves are actuated by means of an adjustable camshaft, wherein the opening times of the inlet valves are adjusted by way of an adjustment of the camshaft, and wherein, before the activation of the deactivated cylinder, the position of the camshaft is adapted in such a way that the opening times of the inlet valves of the active cylinders are adjusted such that the air quantity required for outputting the desired torque is inducted and compressed.

In a further embodiment, in order to fix the opening times of the inlet valves, closing times of the inlet valves are varied.

In a further embodiment, the camshaft is adjusted from a normal position in the direction of retarded closing of the inlet valves and subsequently back in the direction of the normal position while the induction pipe pressure is lowered to the target pressure, in order to maintain the compressed air mass corresponding to the desired torque despite the change in pressure in the induction region.

In a further embodiment, after the activation of the deactivated cylinder, a reduced air mass is compressed in the cylinders, with the torque being kept the same.

Another embodiment provides a control unit which is designed for carrying out a method as disclosed above.

BRIEF DESCRIPTION OF THE DRAWINGS

Example embodiments of the invention are explained in more detail below with reference to the figures, in which:

FIG. 3 shows a diagram of the torque, the induction pipe pressure, the camshaft adjustment and the inducted air mass in the cylinder for a cylinder activation.

DETAILED DESCRIPTION

Figure 1:
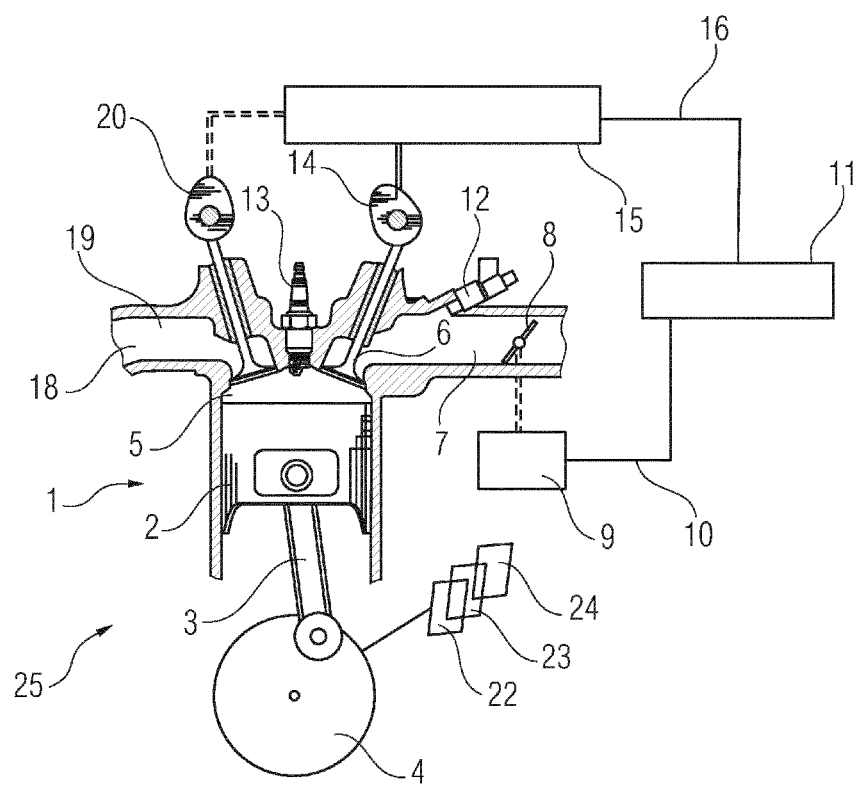
FIG. 1 is a schematic illustration of an internal combustion engine.

Embodiments of the invention provide an improved method for the deactivation of a cylinder of an internal combustion engine and an improved method for the activation of a deactivated cylinder of an internal combustion engine.

The methods may be optimized with regard to fuel consumption and pollutant emissions. This is achieved through the avoidance of ignition retardation and by means of skilful adaptation of the opening times of the inlet valves.

In a further embodiment, the opening times of the inlet valves are achieved by means of an adjustment of a camshaft that actuates the inlet valves. In this way, a simple and reliable technology is used for achieving precise opening times of the inlet valves.

In a further embodiment, for the adaptation of the air quantity that is inducted and compressed, the closing times of the inlet valves are varied. Thus, a simple method is selected for precisely setting the compressed air quantity.

In a further embodiment, during a notional induction phase of the deactivated cylinder, the camshaft is adjusted in an advance direction from a retarded position into a normal position. Since the adjustment of the camshaft takes place during the notional induction phase of the deactivated cylinder, the effects on the combustions in the active cylinders are minor, such that neither an undesired torque fluctuation nor a deterioration of the exhaust gases occurs as a result.

It may be preferable for the deactivation of the cylinder to be performed only after a further engine cycle of the cylinder to be deactivated. In this way, adequate time is available for the adaptation of the pressure in the induction region and the corresponding adjustment of the opening times of the inlet valves of the active cylinders. Furthermore, the resetting of the camshaft in the direction of a normal position can be performed during the first inactive induction phase of the deactivated cylinder.

The method for the activation of the deactivated cylinder has the advantage that the activation is achieved in a fuel-saving manner and without increased exhaust-gas emissions. This is achieved in that the pressure in the induction region of the cylinders is adapted to a lower target pressure, wherein the opening times of the inlet valves of the active cylinders are adapted in such a way that the influence of the change in pressure in the induction region on the compressed air mass is compensated before the cylinder to be activated is activated again. The desired target pressure is attained before the activation of the cylinder.

In one embodiment, the inlet valves are actuated by means of a camshaft, wherein the opening times of the inlet valves are adjusted by means of an adjustment of the camshaft. Before the activation of the deactivated cylinder, the camshaft is adjusted in such a way that the influence of the changing pressure in the induction region on the compressed air quantity of the respective cylinder is compensated.

It may be preferable for the closing times of the inlet valves to be varied in order to adapt the compressed air quantity.

In a further embodiment, the adjustment of the camshaft is started during a notional induction phase of the deactivated cylinder. For compensation of the pressure change in the induction region, it is preferable for the camshaft to be adjusted from a normal position in the direction of retarded closing of the inlet valves and subsequently back in the direction of the normal position in order to adapt the air mass compressed by the individual cylinders in accordance with the desired torque.

The adaptation of the pressure in the induction region is preferably achieved within one engine cycle during a deactivation or activation of a cylinder.

FIG. 1 shows, in a schematic illustration, a detail of an internal combustion engine 25 having a cylinder 1 and having a piston 2 which is movable in the cylinder 1 and which is connected via a connecting rod 3 to a crankshaft 4. Above the piston 2, a combustion chamber 5 is formed in the cylinder 1, which combustion chamber is connected via an inlet valve 6 to an induction region 7. Also provided in the induction region 7 is a throttle flap 8 which is connected to an actuating motor 9. The actuating motor 9 is connected via a control line 10 to a control unit 11. In a manner dependent on the control imparted by the control unit 11, the actuating motor 9 sets a corresponding position of the throttle flap 8 and thereby controls the inflow of air into the induction region 7. It is furthermore possible for the pressure in the induction region 7 to be varied by means of the corresponding adjustment of the throttle flap 8. Also provided is an injection valve 12 which either, as illustrated, injects fuel into the induction region 7 or injects fuel directly into the combustion chamber 5.

Also provided is an ignition plug 13 which projects into the combustion chamber 5. The inlet valve 6 is controlled by means of a camshaft 14 as a valve drive. The camshaft 14 is designed such that the phase of the camshaft, that is to say the rotary position of the camshaft, can be varied in order to vary opening times of the inlet valve 6 independently of the shape of the camshaft 14. For this purpose, a corresponding phase controller 15 is provided which is connected to the camshaft 14. The phase controller 15 is connected via a further control line 16 to the control unit 11. Furthermore, the control unit 11 has further control lines by means of which the injection by the injection valve 12 and the ignition by the ignition plug 13 can be controlled.

For the deactivation of a cylinder, a transmission element which can be deactivated is provided, for example, between the phase-adjustable camshaft 14 and the inlet valve 6 of the first cylinder 1. Said transmission element may for example be a transmission lever and/or a pressure chamber with a movable piston, wherein the position of the lever can be varied such that no transmission of force can take place between the camshaft and the inlet valve or no transmission of force can take place between the camshaft and the pressure chamber. For this purpose, the pressure in the pressure chamber is varied by means of a pump/valve system.

Also provided in the cylinder head of the cylinder 1 is an outlet valve 18 by means of which the combustion chamber 5 can be connected to an exhaust tract 19. For the actuation of the outlet valve 18, a second camshaft 20 is provided which is preferably also designed to be variable in terms of phase by means of the phase controller 15. Depending on the embodiment selected, the second camshaft 20 may also be implemented without variable phase control.

Schematically illustrated in the form of blocks in FIG. 1 are a second, a third and a fourth cylinder 22, 23, 24 which are of analogous design to the first cylinder 1 and which are connected by way of inlet valves to the induction region 7 and by way of outlet valves to the exhaust tract 19. The inlet valves of the further cylinders 22, 23, 24 can likewise be controlled by the camshaft 14. The outlet valves of the further cylinders 22, 23, 24 can be controlled by means of the second camshaft 20. In the exemplary embodiment illustrated, the throttle flap 8 is arranged upstream of the induction regions of the cylinders 1, 22, 23, 24 and can be arranged for the adjustment of the pressure in the induction region of the cylinders 1, 22, 23, 24.

Instead of the inlet valves being controlled by means of a phase-adjustable camshaft, use may also be made of any type of valve drive by means of which the opening times of the inlet valves, in particular the closing times of the inlet valves, can be varied. For example, use may be made of an electromagnetic valve drive or a hydraulic, in particular a camshaft-actuated hydraulic valve drive, for the inlet valves. The control of the opening times of the inlet valves is calculated and implemented by the control unit 11 as a function of operating parameters of the internal combustion engine 25 and a driver demand.

The internal combustion engine 25 can be operated in a first operating mode, in which all of the cylinders 1, 22, 23, 24 are active, burn fuel and output torque. Furthermore, the internal combustion engine 25 can be operated in a second operating mode in which at least one of the cylinders is deactivated and does not perform any combustion of fuel. The deactivation of a cylinder has the advantage that less fuel is consumed. The second operating mode may be used if the internal combustion engine 25 is, even without the deactivated cylinder, capable of providing the torque demanded by the driver. Furthermore, the efficiency of the internal combustion engine 25 increases if throttling losses of the inducted air in the induction region of the internal combustion engine are low, that is to say if the engine is operating at high load. After a deactivation of a cylinder, under the same conditions, the pressure in the induction region is increased such that the throttling losses at the air inlet are lower.

A description will be given below of a method in which the transition from the first operating mode into the second operating mode and back again is performed in an optimized manner in terms of fuel consumption and in an optimized manner in terms of exhaust-gas emissions. A torque-neutral change in operating modes is also made possible by means of the described method.

Figure 2:
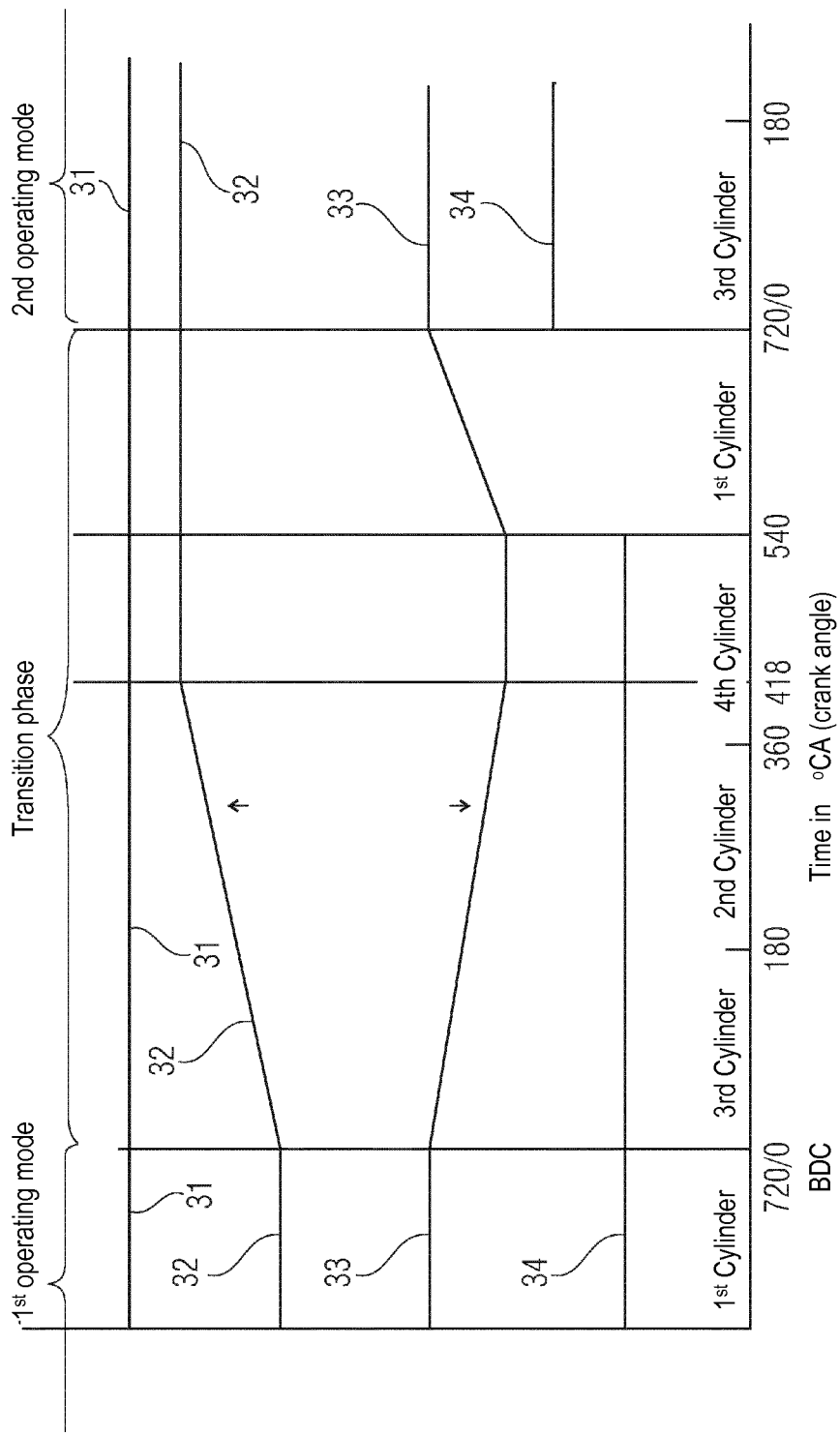
FIG. 2 shows a diagram of the torque, the induction pipe pressure, the camshaft adjustment and the inducted air mass in the cylinder during a cylinder deactivation.

FIG. 2 shows, in a schematic diagram, the induction stroke of the four cylinders 1, 22, 23, 24 plotted versus the crankshaft angle CA. The crankshaft angle is graduated for an engine cycle from 0° to 720° crankshaft angle. Within the 720° crankshaft angle, a cylinder runs through all four strokes of the four-stroke engine. The torque 31, the induction pressure 32, the position of the camshaft 33 and the air mass 34 that is compressed in the respective cylinder are also plotted versus the crankshaft angle CA. In FIG. 2, the induction stroke of the first cylinder is illustrated in the region before 0° crankshaft angle. The induction stroke of the third cylinder begins after 0° crankshaft angle and extends to 180° crankshaft angle. The induction stroke of the second cylinder is between 180° crankshaft angle and 360° crankshaft angle. The induction stroke of the fourth cylinder is between 360° crankshaft angle and 540° crankshaft angle. The notional induction stroke of the deactivated first cylinder is between 540° crankshaft angle and 720° crankshaft angle. Beyond the crankshaft angle of 720°, a new engine cycle begins again with the induction stroke of the third cylinder, which again extends to 180° crankshaft angle. The diagram depicts, before the time of 0° CA, the situation in which the internal combustion engine 25 is in the first operating mode, in which all of the cylinders are active. If it is now decided by the control unit 11, as a function of predefined threshold values, that the internal combustion engine 25 is to be operated with a reduced number of cylinders, that is to say that the first cylinder 1 is to be deactivated, then it is preferably the case that a subsequent further induction stroke of the first cylinder to be deactivated, in this case the first cylinder 1, is performed without changes. Said further induction stroke corresponds to the region from 180° CA before 0° CA.

The transition phase begins after the closing of the inlet valve of the first cylinder 1. In the example described, the duration of the transition phase is 720° CA, that is to say one engine cycle. In the diagram illustrated, the start of the transition phase corresponds to the crankshaft angle 0°. Starting at 0° CA, the pressure 32 in the induction region 7 is adjusted in the direction of a target pressure by means of a variation of the position of the throttle flap 8. The target pressure corresponds to a pressure in the induction region with which, under unchanged conditions, the same torque is provided by three cylinders of the internal combustion engine. For this purpose, the pressure 32 is increased in the direction of the target pressure. The increase to the target pressure should be completed at the latest when a cylinder following the deactivated first cylinder commences its induction phase. In our example, this is at the time of 720° crankshaft angle. It is preferable for at least the adaptation of the pressure 32 to have already been completed before the deactivated first cylinder runs again through a notional induction stroke. In our example, this is at approximately 540° crankshaft angle. The transition phase starts at 0° crankshaft angle, wherein the control unit 11 both raises the induction pressure 32 and also shifts the position of the camshaft 33 from a normal position in the direction of retarded closing of the inlet valves. The aim of this adaptation is firstly to raise the pressure 32 in the induction region and secondly to keep the air mass 34 compressed by the individual cylinders constant.

In the example described, the target pressure is attained at the crankshaft angle of 418°. Furthermore, it is preferably the case that, after the target pressure is attained, no further retardation of the camshaft is performed. This is possible because the adjustment of the camshaft can take place more quickly than the adaptation of the pressure 32. At 418° crankshaft angle, the fourth cylinder 24 is in the induction stroke. The first cylinder 1 is deactivated by means of corresponding control, such that, at the latest beyond a crankshaft angle of 540°, at which the next induction stroke of the first cylinder 1 would take place, no further induction is performed by the first cylinder 1. It is preferable for the outlet valve of the first cylinder 1 to also be deactivated.

During the notional induction stroke of the first cylinder 1, which takes place in the range from 540° crankshaft angle (CA) to 720° crankshaft angle, the camshaft is reset in the direction of a normal position. No other inlet valve of the internal combustion engine is open during this time period. It is thus possible for the resetting of the camshaft to take place without an induction phase of a cylinder being influenced. Subsequently, both the induction pressure 32 and also the compressed air mass 34 correspond to the values required for the desired torque. Thus, the transition phase comes to an end at the latest at the crankshaft angle of 720°, at which an induction stroke of the third cylinder, which follows the deactivated first cylinder, begins. In order that only three cylinders generate the same torque as four cylinders, it is provided that, by means of a higher pressure 32 in the induction region, each of the active cylinders compresses a greater air mass. Furthermore, in a corresponding manner, the injected fuel quantity is adapted by the control unit by means of corresponding control of the injection valves. In this way, the second operating mode of the internal combustion engine 25 begins at the crankshaft angle of 720°, in which second operating mode only three cylinders participate in the combustion and the generation of torque. Depending on the selected embodiment, it is also possible for more than one cylinder to be deactivated by means of the described method. Furthermore, the method may also be used for internal combustion engines having more than or fewer than four cylinders. The method described on the basis of FIG. 2 corresponds to a situation in which the torque demanded by the driver does not change and in which, also, no further change in operating parameters of the internal combustion engine takes place that could lead to a change in torque.

Depending on the selected embodiment, the time at which the target pressure prevails in the induction region and the camshaft reaches the normal position again may preferably be reached before the induction stroke of the cylinder that follows the deactivated cylinder.

FIG. 3 shows, on the basis of a further diagram, a method for the activation of a deactivated first cylinder 1. In the diagram, the torque 31 of the internal combustion engine, the induction pressure 32 in the induction region 7, the position 33 of the camshaft, and the air mass 34 compressed per cylinder are illustrated versus the crankshaft angle CA. In FIG. 3, the induction phase of the fourth cylinder is illustrated before 0° crankshaft angle. The induction stroke of the first cylinder is illustrated between 0° and 180° crankshaft angle, the induction stroke of the third cylinder is illustrated between 180° crankshaft angle and 360° crankshaft angle, the induction stroke of the second cylinder is illustrated between 360° crankshaft angle and 540° crankshaft angle, and the induction stroke of the fourth cylinder is illustrated between 540° crankshaft angle and 720° crankshaft angle. A new engine cycle begins at the crankshaft angle of 720°. The internal combustion engine 25 is situated at 0° CA in the second operating mode, in which the first cylinder 1 is deactivated and does not participate in the combustion. The induction strokes of the cylinders are also indicated with the designation of the cylinders.

If the control unit now decides, as a function of predefined parameters, for example during an induction stroke of the fourth cylinder 24, that the first cylinder 1 is to be reactivated, the pressure 32 in the induction region 7, that is to say the induction pressure, is lowered in the direction of a new target pressure by means of a corresponding variation of the position of the throttle flap 8. The change in the throttle flap position preferably takes place immediately after the decision to reactivate the first cylinder, for example at 0° crankshaft angle.

The transition phase then begins at 0° crankshaft angle. Since the following induction stroke is however assigned to the first, deactivated cylinder 1, the induction pressure thus does not immediately change. Only at the start of the induction stroke of the third cylinder 23 at the crankshaft angle 180° does the induction pipe pressure 32 fall owing to the induction by the third cylinder 23.

It is furthermore preferably provided that a retardation of the camshaft 14 is performed starting at the notional induction stroke of the deactivated first cylinder, that is to say at the time of 0° crankshaft angle. This is advantageous in order to adapt the air mass 34 inducted and compressed by the cylinders to the target pressure. Depending on the change in the induction pressure 32, it may be necessary, during the transition phase, for the position 33 of the camshaft 14 of the inlet valves 6 to be reset to the normal position again. This is the case, in the illustrated exemplary embodiment, between the crankshaft angles of 360° and 560°. It is important for the transition region, that is to say the adaptation of the pressure 32 (induction pipe pressure) in the induction region to the target pressure, to be accomplished before the first active induction stroke of the reactivated first cylinder 1. In the exemplary embodiment illustrated, the transition phase is completed at the crankshaft angle 680°.

The first operating mode begins at 720° CA. The first induction stroke of the newly activated first cylinder 1 begins at the crankshaft angle 720° or 0°.

What is claimed is:

1. A method for the deactivation of a cylinder of an internal combustion engine having multiple cylinders, each having an induction region and an inlet valve, the method comprising:
   for preparation for a deactivation of a cylinder, raising a pressure in the induction regions of the cylinders to a higher target pressure corresponding to a pressure intended to prevail in the induction region after the deactivation of the cylinder in order to compress a desired air mass for outputting a desired torque,
   during the raising of the pressure in the induction region, adjusting opening times of the inlet valves of the cylinders such that the desired air mass corresponding to the desired torque is inducted into the cylinders and compressed,
   deactivating a cylinder after the target pressure is attained, and
   after deactivating the cylinder, adjusting the opening times of the inlet valves of the other cylinders such that the desired torque is output,
   wherein the opening times of the inlet valves are adjusted by means of an electromagnetic valve drive or a camshaft actuated hydraulic valve drive.

2. The method of claim 1, wherein:
   during a notional induction phase of the deactivated cylinder, the opening times of the inlet valves of the active cylinders are adjusted such that an air quantity required for outputting the desired torque is induced and compressed.

3. The method of claim 1, comprising varying closing times of the inlet values in order to fix the opening times of the inlet valves.

4. The method of claim 2, comprising retarding closing of the inlet valves while the induction pipe pressure is raised to the target pressure.

5. The method of claim 2, comprising adjusting the timing of the inlet valves during the notional induction phase of the deactivated cylinder to a more advanced normal timing.

6. The method of claim 1, comprising, after the deactivation of the cylinder, compressing an increased air mass in the cylinders, with the torque being kept the same.

7. A method for the activation of a deactivated cylinder of an internal combustion engine having multiple cylinders including the deactivated cylinder and a plurality of active cylinders, each of the multiple cylinders having an induction region and an inlet valve, the method comprising:
for preparation for an activation of the deactivated cylinder, lowering a pressure in the induction region of the cylinders to a lower target pressure corresponding to a pressure intended to prevail in the induction region after the activation of the cylinder in order to induct and compress a desired air mass for outputting a desired torque,
during the lowering of the pressure and at a time when a notional induction stroke of the deactivated cylinder begins, adjusting opening times of the inlet valves of the active cylinders such that the air mass corresponding to the desired torque is compressed in the cylinders,
before the activation of the deactivated cylinder, adjusting the opening times of the inlet valves of the active cylinders such that the desired torque is output, and
activating the deactivated cylinder after the target pressure is attained.

8. The method of claim 7, wherein:
the inlet valves are actuated by an adjustable camshaft,
the opening times of the inlet valves are adjusted by an adjustment of a camshaft, and
before the activation of the deactivated cylinder, the position of the camshaft is adapted such that the opening times of the inlet valves of the active cylinders are adjusted such that an air quantity required for outputting the desired torque is induced and compressed.

9. The method of claim 7, comprising varying closing times of the inlet values of the active cylinders in order to fix the opening times of the inlet valves of the active cylinders.

10. The method of claim 8, comprising adjusting the camshaft from a normal position in a direction of retarded closing of the inlet valves and subsequently back in a direction of the normal position while the induction pipe pressure is lowered to the target pressure, in order to maintain the compressed air mass corresponding to the desired torque despite the change in pressure in the induction region.

11. The method of claim 7, comprising, after the activation of the deactivated cylinder, compressing a reduced air mass in the cylinders with the torque being kept the same.

12. A control unit for the deactivation of a cylinder of an internal combustion engine having multiple cylinders, each having an induction region and an inlet valve, the control unit comprising:
a processor; and
computer instructions stored in non-transitory computer-readable medium and executable by the processor to:
for preparation for a deactivation of a cylinder, increasing a pressure in the induction regions of the cylinders to a higher target pressure corresponding to a pressure intended to prevail in the induction region after the deactivation of the cylinder in order to compress a desired air mass for outputting a desired torque,
during the increasing of the pressure in the induction region, adjust opening times of the inlet valves of the cylinders such that the desired air mass corresponding to the desired torque is inducted into the cylinders and compressed,
deactivate a cylinder after the target pressure is reached, and
after deactivating the cylinder, adjust the opening times of the inlet valves of the other cylinders such that the desired torque is output
wherein the opening times of the inlet valves are adjusted by means of an electromagnetic valve drive or a camshaft actuated hydraulic valve drive.

13. The control unit of claim 12, wherein:
the computer instructions are further executable to, during a notional induction phase of the deactivated cylinder, adjust the opening times of the inlet valves of the active cylinders such that an air quantity required for outputting the desired torque is inducted and compressed.

14. The control unit of claim 13, wherein the computer instructions are executable to retard closing of the inlet valves while the induction pipe pressure is raised to the target pressure.

15. The control unit of claim 13, wherein the computer instructions are executable to adjust the closing of the inlet valves a retarded closing position during the notional induction phase of the deactivated cylinder in a direction of a more advanced normal position.

16. The control unit of claim 12, wherein the computer instructions are executable to vary closing times of the inlet values in order to fix the opening times of the inlet valves.

17. The control unit of claim 12, wherein the computer instructions are executable to, after the deactivation of the cylinder, cause the compression of an increased air mass in the cylinders, with the torque being kept the same.

* * * * *